United States Patent [19]

Pauli

[11] 3,884,049

[45] May 20, 1975

[54] DRIVE COUPLING
[75] Inventor: Ernest H. Pauli, Watchnung, N.J.
[73] Assignee: The Hilliard Corporation, Elmira, N.Y.
[22] Filed: Sept. 5, 1972
[21] Appl. No.: 286,346

[52] U.S. Cl. .................................................. 64/14
[51] Int. Cl. ............................................. F16d 3/64
[58] Field of Search............ 64/14, 9, 6, 16, 27 NM

[56] References Cited
UNITED STATES PATENTS
2,973,633   3/1961   Hall ....................................... 64/14
3,396,556   8/1968   Giegerich............................... 64/14

FOREIGN PATENTS OR APPLICATIONS
368,356   2/1939   Italy........................................ 64/14
713,102   8/1954   United Kingdom................... 64/9 R Primary Examiner—Samuel Scott
Assistant Examiner—Randall Heald
Attorney, Agent, or Firm—Melford F. Tietze

[57] ABSTRACT

A flexible drive coupling for power transmission shafts having self tightening features including a tapered bushing element and positioning means engageable with the drive shaft and a power coupling member supported on said bushing adapted during power transmission to be more tightly engaged on said bushing.

7 Claims, 9 Drawing Figures

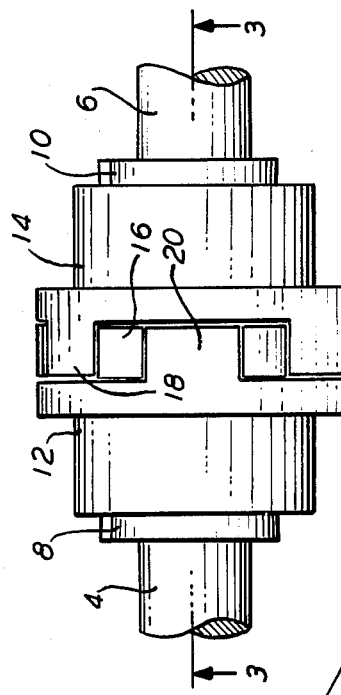
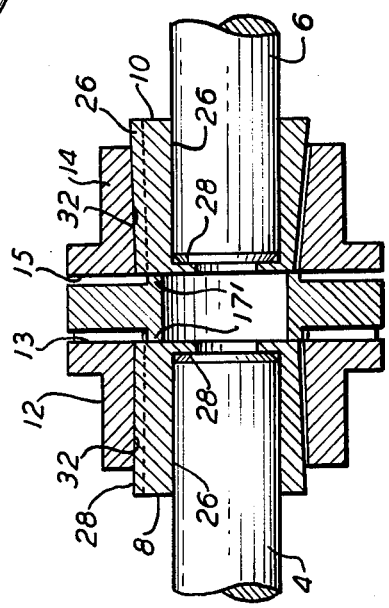

DRIVE COUPLING

BACKGROUND OF THE INVENTION

Considerable difficulty has been encountered in providing flexible drive couplings of simple and effective design and operation and reasonable cost. Such couplings must have the capability of accommodating reasonable non-alignment between the shaft members to be coupled and be substantially trouble free over extended periods of operation. There are a vast number of products that utilize motors and/or power transmission shafts and the need for such coupling means is virtually endless.

Certain types of flexible coupling devices employ screw or clamp fastening devices for securing the coupling elements to their respective shafts. However, the vibration and longitudinally opposing forces acting on such members tend to eventually loosen them or materially reduce their efficient operation. When such members become loose or even slightly out of proper operative position, heat and friction quickly ensue causing failure or interruption of service.

A particularly troublesome problem of this nature exists in connection with drive shafts of relatively small diameter. Such shafts are frequently employed in small mechanical installations in which low cost is particularly significant. Systems of such kind, also, often are fabricated in large scale, production line type manufacturing installations placing a premium on simplicity of installation.

OBJECTS AND BRIEF SUMMARY OF THE INVENTION

Accordingly, it is an object of this invention to provide a flexible drive coupling device of simple and low cost design which is effectively resistant to loosening druing operation.

A further object of the invention is to provide such a coupling device made of a plastic material, of which the component interchangeable elements may be molded and require a minimum of machining.

A further object of the invention is to provide a flexible coupling device which may be mounted on the shafts to be coupled without the use of screws or similar securing means and which are self-tightening on said shafts under load.

A still further object of the invention is to provide molded plastic coupling components comprising a bushing member adapted to be seated on a shaft having a tapered outer surface and a mating coupling head received on said bushing wherein said assembled elements are adapted to co-act with similar members to form a coupling between adjacent shafts.

A still further object of the invention is to provide means in such molded bushing and coupling head effective at their inter-engaging surfaces to provide a resilient and more effective engagement therebetween.

A still further object of the invention is to provide such molded plastic flexible coupling means in alternative construction forms particularly adapted to small diameter shafts and in which screw fastening or similar threaded means are received in metallic or other suitable anchoring means readily attachable to said coupling means.

These and other objects of the invention are achieved by the provision of plastic coupling elements comprising a bushing to be received on a shaft to be coupled, engageable means of said bushing abutting with said shaft to retain the bushing in fixed axial position against longitudinal thrust, said bushing having an outer divergently tapered cylindrical surface, and a coupling head having an inner mating bore to be received on said bushing, the head having longitudinally projecting members adapted to form a driving engagement with similar coupling means on an adjacent shaft. Advantageously, the confronting engaging surfaces of said longitudinally extending members are separated by resilient means through which the torsional driving force is transmitted between the coupling heads. The interface between the tapered bushing and coupling head advantageously incorporates longitudinally extending small ridges formed on either or both of said members.

BRIEF DESCRIPTION OF THE DRAWINGS

A preferred embodiment of the invention is shown in the accompanying drawings in which:

FIG. 1 is a side elevation view of a flexible coupling mounted on and forming a drive coupling between two adjacent shafts;

FIG. 2 is an exploded view of the coupling shown in FIG. 1;

FIG. 3 is a longitudinally cross-section view taken along the line 3—3 in FIG. 1 and looking in the direction of the arrows;

DESCRIPTION OF PREFERRED EMBODIMENT

Figure 4:
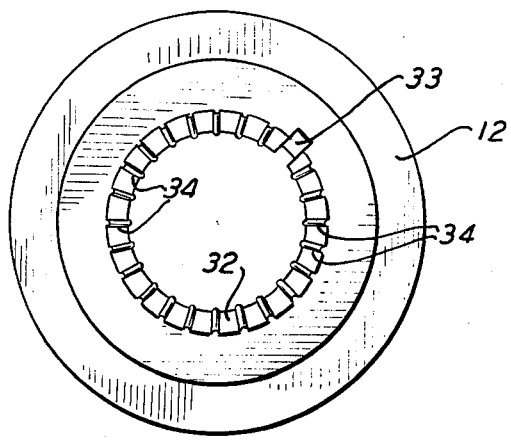
FIG. 4 is an end view along the plane 4—4 in FIG. 3 looking in the direction of the arrows showing a coupling head and illustrating ridge formations in the interior tapered bore thereof.

A flexible drive coupling 2 according to the invention is shown in FIG. 1 forming a power transmission coupling between a drive shaft 4 and a driven shaft 6. The coupling comprises bushing members 8 and 10 which are received respectively on the shafts 4 and 6 and coupling heads 12 and 14 mounted on the bushings. The numeral 16 identifies a spoke-shaped spacer element interposed between the projecting lugs 18 and 20 of the coupling heads through which the driving force is transmitted from one coupling head to the other and hence from drive shaft 4 to shaft 6.

Further details of the coupling are more readily described by reference to FIGS. 2 and 3. The bushings 8 and 10 may be keyed to their shafts such as by the keys 22 and 24 received in conventional registered slots in their respective shafts and bushings. Each bushing has an inner cylindrical bore 26 as seen in FIG. 3 in which the ends of the shafts are received. The ends of the bores 26 have lips 28 which form an abuttment with the ends of the shafts and prevent the bushings from moving further onto their respective shafts. The outer surfaces 30 of the bushings are divergently tapered so as to flare outwardly away from the adjacent ends of the shafts 4 and 6. Such taper may be from 5½° to 8° from axial, and about 6 degrees is particularly effective.

The coupling heads 12 and 14 have corresponding inner tapered bores 32 which are adapted to be received on the tapered surfaces 30 of their respective bushings. The heads may be rotationally locked on the bushings by key portions 32 on the bushings received in slots 33. The projecting lugs 18 and 20 on the coupling heads as seen in FIG. 2 comprise three in number. More such lugs may be used if desired particularly in association with larger diameter shafts and correspondingly larger coupling heads. With the shafts in operative juxtaposition, the lugs are in overlapping relation. The spacer member 16 is a spoke-shaped member having a cylindrical body 16' and a series of radially projecting spokes 17 (six lugs corresponding to the six spaces between the overlapping lugs 18 and 20) which are interposed between the lugs 18 and 20. An annular rib 17' protrudes on each end of the spacing member and serves to space the end faces from the adjacent end faces of bushings 8 and 10 and the flush end faces 13 and 15 of the coupling heads when the assembly is mounted for operation. Such provision in coupling means embodying a compressible material between the coupling elements is well-known. By warrant of a construction such as that hereinabove described, the shafts and consequently, the coupling members respectively mounted thereon may be in slight misalignment so as to thereby accommodate the frequently encountered situation where such adjacent shaft members are not normally in perfect axial alignment. The permitted angulation between the coupling heads as they rotate resulting from the ability to transmit the driving force through the overlapping lug members 18 and 20 and the interposed compressible spacer member 16, makes such accommodation of misalignment possible.

The bushing and coupling head elements of the coupling 2 are preferably made of a plastic material suitable for molding to produce a substantially dense dimentionally stable and relatively strong molded part. Suitable plastic materials for such use include lexan (a polycarbonate) and nylon, although other conventionally available plastic materials having such suitable properties may be employed.

The tapered bores 32 each have a series longitudinally extending ribs 34 substantially uniformly spaced around the interior thereof. The ribs follow the contour of the tapered bore and hence converge slightly toward the reduced end of the bore. The ends of the ribs may readily be seen in FIG. 4. It will be noted that the ribs are small in cross-section and radial projection. Their size may be selected to give the optimum results for any particular size of shaft and bushing and coupling head members. The presence of such ribs is found to be necessary in order to maintain rotational stability between the two molded plastic parts in engagement. It is believed that each rib is capable of being resiliently deformed individually according to the localized stress imparted thereto when the coupling head is mounted on the bushing member. Such deflection accommodates minor distortion of the molded parts while enabling a secure and uniform fitting of the pieces. Additionally, the resilient deformation of the ribs as axial thrust is imparted on the coupling head member enhances the frictional locking engagement between the tapered surfaces. Generallly, it has been found that ribs in the order of 0.002 to 0.003 inches afford optimum results for a wide range of shaft and bushing diameters and that in general a range in the order of 0.001 to 0.005 inches would encompass most operational size units. The greater radial projection is associated with larger size diameters and heavier bushings in which the tightening stress and stress resulting during usage would correspond to the forces required to derive the intended compression of the individual ridges to achieve enhanced locking action. In general, the circumferential dimensions of the ridges would correspond substantially to the radial projection. Generally, about 20 to 30 uniformly spaced such ribs will be effective.

In use, the bushings 8 and 10 are placed on the ends of their respective shafts with the lip portions 28 of the bushings engaging with the ends of each of the shafts. The coupling heads are then placed on the respective bushings and pressed so as to form a relatively tight fit on the outer tapered surface of the bushings. The spider member 16 is then arranged so as to fill the gaps between the overlapping driving lugs of the coupling heads as seen in FIG. 1 and the shafts secured in their desired operative positions. It will be appreciated that under normal circumstances, the shafts will generally not be in perfect alignment. Consequently, the coupling heads will have a slight angular relationship to one another which during operation results in an axial thrust tending to force apart the respective halves of the coupling connection. Such separating thrust acting substantially equally and oppositely on the coupling heads 12 and 14 is resisted by the respective bushings 8 and 10 which are held in a fixed relationship to their respective shafts. Consequently, such thrust serves to further increase the tightening force acting between the bushing and its coupling head. It will be noted that despite any slight further change in alignment or wear between the coupling heads or between the respective bushings and their coupling heads, that the separating thrust will merely serve to maintain a desired firmness in the driving connection between the parts. Such action is characteristically different from that which results in similar coupling devices relying upon screws and similar fastening devices which have no provision for accommodating looseness or play that may develop during use.

Figure 7:
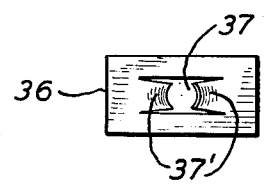
FIG. 7 is a plan view showing a locking nut employed in FIGS. 5 and 6.
Figure 5:
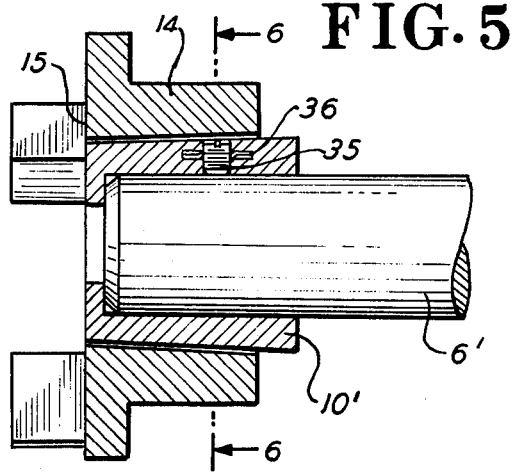
FIG. 5 is a longitudinal cross-sectional view of the coupling members for one shaft as seen in FIG. 3 but showing an alternate means for securing the bushing member on the shaft.
Figure 6:
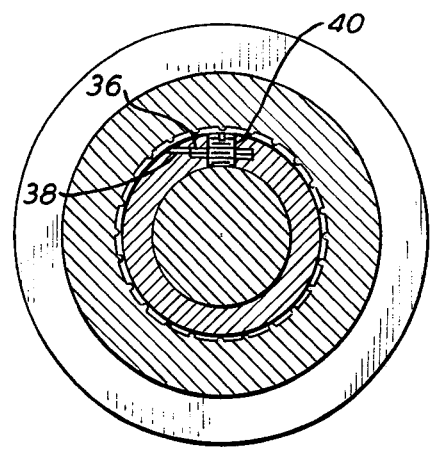
FIG. 6 is a transverse sectional view taken along the line 6—6 in FIG. 5 looking in the directions of the arrows.

The alternative embodiment is shown in FIGS. 5 and 6 in which a set screw is utilized to secure the inner bushing member 10' on its shaft member 6'. Inasmuch as the plastic material of which the bushing 10' is made is not entirely satisfactory for withstanding the localized stress imparted by the threaded engagement of the screw, an insertable lock nut device 36 is utilized to receive the screw. As seen in FIG. 7, the lock nut is of a rectangual stamped piece of metal having a central bore 37 formed between stamped out portions 37' that can deflect which threadedly receive the screw. The nut is inserted laterally in a rectangual shaped slot 38 until its central opening is in alignment with the radial passage 40 in which the screw 34 is received. It will be seen that the slot 38 effectively retains the nut 36 to allow the screw to be inserted and threaded into tightening engagement with the shaft.

Figure 8:
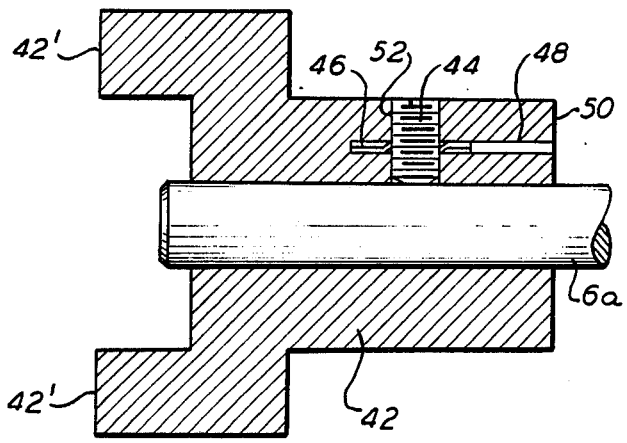
FIG. 8 is a sectional view of an alternate construction of the coupling head member containing screw retaining means and an insertable threaded member for receiving the screw.
Figure 9:
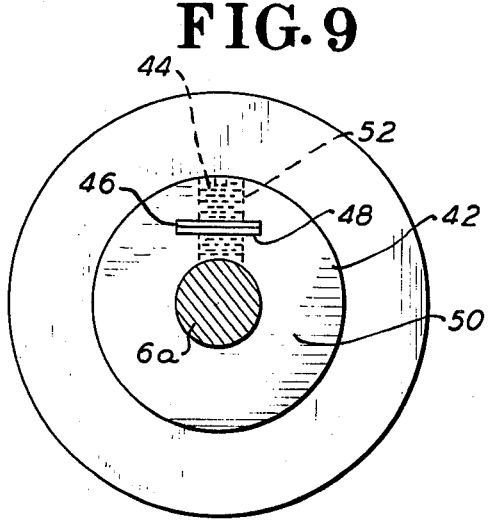
FIG. 9 is a partially sectional end view of the coupling head in FIG. 8.

FIG. 7 and 8 illustrate another embodiment which is particularly suited for use in connection with shafts of particularly small diameter such as that shown at 6a. In shafts of such diameter, space occasionally will not permit the use of an intermediate tapered bushing element as described hereinabove. Accordingly, in such situations, a coupling head such as that shown at 42 is provided to be received directly on the shaft 6a. The coupling head is provided with rearwardly extending lugs 42' which are identical in form and function to the lugs 18 and 20 described in connection with the embodiment of FIGS. 1 to 4. The coupling head is retained on the shaft by a screw 44 threadedly received in a locking nut 46 whose construction is identical to that described in connection with FIGS. 5 and 6 above. In this embodiment, a rectangular shaped slot shown at 48 may be formed extending inwardly from the end face 50 of the coupling head. Radial opening 52 receives this tightening screw when the locking nut and its central opening therein are in alignment for accommodation of the screw as before described. It is to be noted that the screw retention means herein described provide a significantly improved retention means for molded plastic articles such as those with which the present invention is particularly concerned. The rectangular slots 38 and 48, for example, may be molded in their respective members as may be the radial bores 40 and 52. Consequently by an extremely simple expedient of inserting the lock nuts in the already formed rectangular slots, a powerful and durable threading means is afforded in an otherwise unsatisfactory plastic material which greatly enhances the capability of firmly securing the coupling elements on their respective shafts.

While the present invention has been particularly described in terms of specific embodiments thereof, it will be clear that numerous modifications and departures therefrom are permissible and that the instant invention is to be construed therefore and limited only by the scope of and spirit of the claims appended hereto.

I claim:

1. A flexible coupling device forming a drive coupling between two shafts in adjacent substantially axially aligned relation comprising a removable bushing member on the adjacent end(s) of each of said shafts, each bushing member having a uniform diameter, inner shaft receiving bore and means fixing its relative axial movement (thereon) on its shaft and an outer cylindrical surface tapered outwardly from the end(s) of said shaft(s), and coupling head members mounted on each of said bushings having longitudinally projecting portions extending toward one another and in overlapping relation to provide a torque transmitting drive connection, said coupling heads having inner tapered cylindrical bores substantially mating with and received respectively on said tapered bushing surfaces.

2. A flexible coupling device according to claim 1 wherein longitudinally extending compressible rib members are formed between the engaging tapered surfaces of said bushing and said coupling head.

3. A flexible coupling device according to claim 1 wherein said shaft receiving bore of said bushing terminates at a preselected depth thereby fixing the longitudinal displacement of said bushing on said shaft.

4. A flexible coupling device according to claim one wherein resilient space means is interposed between the confronting end faces of said coupling head means and between said longitudinally projecting drive transmitting portions thereof.

5. A coupling device according to claim one in which said bushings and coupling head members are molded of plastic material.

6. A flexible coupling device according to claim 2 made of molded plastic material wherein said rib members are serrations extending axially within the tapered bores of said bushing members and comprise inwardly extending radial projections in the order of 0.001 to 0.005 inches.

7. A coupling device according to claim 5 wherein said bushing member contains a metal element mounted therein and a radially adjustable screw member is threadedly received by said metal element for locking engagement with said shaft.

* * * * *